(12) United States Patent
Stupiggia

(10) Patent No.: US 12,479,310 B2
(45) Date of Patent: Nov. 25, 2025

(54) ADAPTATION OF A PROPULSION PROFILE OF A MOTOR VEHICLE DRIVEN BY AN ELECTRIC MOTOR

(71) Applicant: Bayerische Motoren Werke Aktiengesellschaft, Munich (DE)

(72) Inventor: Andrea Stupiggia, Deisenhofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 408 days.

(21) Appl. No.: 17/967,663

(22) Filed: Oct. 17, 2022

(65) Prior Publication Data

US 2023/0122737 A1 Apr. 20, 2023

(30) Foreign Application Priority Data

Oct. 18, 2021 (DE) ...................... 10 2021 126 935.0

(51) Int. Cl.
*B60L 15/20* (2006.01)
(52) U.S. Cl.
CPC ........... *B60L 15/20* (2013.01); *B60L 2250/16* (2013.01); *B60L 2250/26* (2013.01)
(58) Field of Classification Search
None
See application file for complete search history.

(56) References Cited

U.S. PATENT DOCUMENTS

| | | | |
|---|---|---|---|
| 2018/0143733 A1* | 5/2018 | Ochenas | B66F 17/003 |
| 2019/0337391 A1* | 11/2019 | Crombez | B60W 30/18127 |
| 2023/0139003 A1* | 5/2023 | Bhasme | B60L 58/16 |
| | | | 701/533 |

FOREIGN PATENT DOCUMENTS

| | | |
|---|---|---|
| DE | 10 2006 045 824 A1 | 4/2008 |
| DE | 10 2016 208 082 A1 | 11/2017 |
| DE | 10 2018 202 336 A1 | 8/2019 |
| DE | 10 2018 212 298 A1 | 1/2020 |
| EP | 1 459 928 A2 | 9/2004 |

OTHER PUBLICATIONS

German Search Report issued in German application No. 10 2021 126 935.0 dated Apr. 7, 2022, with Statement of Relevancy (Eight (8) pages).

* cited by examiner

*Primary Examiner* — Navid Z. Mehdizadeh
*Assistant Examiner* — Jason R Roberson
(74) *Attorney, Agent, or Firm* — Crowell & Moring LLP

(57) ABSTRACT

The invention relates to a device for determining a propulsion profile to be applied during the operation of an electric drive motor of a motor vehicle driven by an electric motor, wherein in each case a manifestation to be applied of one or more propulsion parameters can be saved in the propulsion profile for different propulsion actuator presets by a vehicle user, and the device is designed to determine the propulsion profile to be applied with the aid of at least one propulsion curve which in each case assigns different manifestations of the propulsion parameter or parameters to different propulsion actuator presets.

12 Claims, 8 Drawing Sheets

ADAPTATION OF A PROPULSION PROFILE OF A MOTOR VEHICLE DRIVEN BY AN ELECTRIC MOTOR

CROSS REFERENCE TO RELATED APPLICATION

This application claims priority under 35 U.S.C. § 119 from German Patent Application No. 10 2021 126 935.0, filed Oct. 18, 2021, the entire disclosure of which is herein expressly incorporated by reference.

BACKGROUND AND SUMMARY OF THE INVENTION

The invention relates to a device for determining a propulsion profile to be applied during the operation of an electric drive motor of a motor vehicle driven by an electric motor, to a motor vehicle driven by an electric motor and having such a device, and to a method for determining a propulsion profile for a drive motor of a motor vehicle driven by an electric motor.

In the case of motor vehicles driven by an internal combustion engine, it is known that the user of the vehicle can choose from two or three propulsion profiles, for example from an ecologically optimized profile, a balanced profile, and a sports-oriented profile.

Such a selection is analogously also known for motor vehicles which are driven by an electric motor and hybrid vehicles. A characteristic of the electric drive motors is here that the development of power, in other words the development of acceleration over time, can, because of the finer control options (PWM, space vector modulation), be set much more finely and in particular can be varied much more flexibly than in the case of internal combustion engines.

Nevertheless, to do this, essentially only selection from ready-made provided propulsion profiles, provided for the vehicle user by the vehicle manufacturer, is also offered.

Against this background, an object of the embodiments and principles of the invention disclosed herein is to improve adaptation of power development of an electric drive motor by a vehicle user.

According to at least one embodiment, a device for determining a propulsion profile to be applied during the operation of an electric drive motor of a motor vehicle driven by an electric motor is disclosed.

In such a propulsion profile, a manifestation to be applied of one or more propulsion parameters can in each case be saved for different propulsion actuator presets (in other words, propulsion actuator presets which are preset by a vehicle user during operation of the vehicle, in particular pedal positions).

The device is designed to determine the propulsion profile to be applied with the aid of one or more propulsion curves (or with the aid of a set of propulsion curves which each assign different manifestations of the propulsion parameters to different propulsion actuator presets).

The device is designed, in order to determine the propulsion profile to be applied, to record a user input of the vehicle user to select and/or configure one or more propulsion curves and take it or them into account when determining the propulsion profile to be applied.

The vehicle user (i.e. for example a driver or a vehicle operator who would like to preset a propulsion characteristic for a self-driving vehicle or a parent of a young driver who would like to preset a defensive propulsion characteristic for the inexperienced driver) can consequently set the way in which the propulsion develops in particular over time and/or with the aid of a specified preset of the propulsion actuator, in particular with the aid of a position of the propulsion actuator such as, for example, a pedal position or the development of the latter over time. In particular, the propulsion profile can be a speed profile and/or an acceleration profile and/or a combination thereof.

In at least one embodiment, a propulsion profile is understood to mean a set of rules in which it is determined which manifestation or manifestations of one or more propulsion parameters is or are to be applied for which propulsion actuator preset.

In at least one embodiment, a propulsion curve is understood to mean in particular a characteristic curve by means of which different propulsion requests are assigned to different manifestations of a determined propulsion parameter.

In at least one embodiment, a propulsion actuator is understood to mean in particular an actuator by means of which propulsion of the motor vehicle is preset in different fashions according to the position of the actuator. Such a propulsion actuator can be, for example, an accelerator pedal (also referred to as a gas pedal) or a hand-operated lever or a joystick or a real-time input on a touch-sensitive screen.

A propulsion profile can be determined in particular by one or more propulsion curves.

According to at least one further embodiment, a motor vehicle driven by an electric motor and having an electric drive motor and a device according to an embodiment of the invention is disclosed, wherein a control unit of the motor vehicle is connected to the device, in particular for the purpose of information exchange, and is designed to adapt and/or modify a propulsion profile to be applied for the drive motor depending on the user input of the vehicle user and to control the drive motor accordingly.

According to at least one further embodiment, a method for determining a propulsion profile for a drive motor of a motor vehicle driven by an electric motor is disclosed which has at least the following method steps which can be performed in the stated or a different appropriate sequence: (1) displaying a preset propulsion profile depending on at least one propulsion parameter, in particular by means of a display and input unit of the device; and/or (2) inputting at least one modified manifestation of the propulsion parameter to at least one propulsion actuator preset, in particular by means of the display and input unit; and/or (3) adapting the propulsion profile to the modified manifestation or manifestations of the propulsion parameter or parameters in the propulsion profile.

The principles and embodiments described herein are based, inter alia, on the consideration that, in the case of vehicles driven by an electric motor, the power development (which can be preset in particular by means of a propulsion profile) can be set with much higher degrees of freedom than in the case of an internal combustion engine, in particular in the case of control based on pulse width modulation (PWM), in particular with space vectoring.

The principles and embodiments described herein are also based, inter alia, on the idea of allowing a vehicle user to configure the power development themselves freely or at least with a plurality of freely configurable adaptations, optionally with limits which can be fixed; in contrast to simply selecting from a few ready-made propulsion profiles without any possibility of influencing these presets.

According to at least one embodiment, the propulsion parameter is a longitudinal speed and/or a longitudinal acceleration of the motor vehicle. The vehicle user can thus assign a determined longitudinal speed to a determined position of the propulsion actuator.

According to at least one embodiment, the propulsion actuator preset is determined depending on a pedal position. The invention can thus be applied to the most common propulsion actuator, namely a gas pedal (also referred to as an accelerator pedal).

According to at least one embodiment, the propulsion actuator preset is determined depending on a duration since another previous, in particular the last, change to the propulsion actuator preset. The vehicle user can thus specify how the propulsion develops when a determined position of the propulsion actuator, in particular the accelerator pedal, is maintained in a constant position over a determined period of time. A more defensive or a more offensive acceleration characteristic can consequently be set, for example a rapid pedal response or a delayed pedal response.

According to at least one embodiment, the propulsion curve reproduces a desired relationship between the pedal position and the longitudinal speed of the motor vehicle. A more defensive or more offensive acceleration characteristic, for example a rapid pedal response or a delayed pedal response, can consequently be set for a determined operation of the pedal.

According to at least one embodiment, the propulsion curve reproduces a desired relationship between an amount of time passed since the last change to the pedal position and the longitudinal speed of the vehicle. The vehicle user can thus specify how the propulsion develops when a determined position of the accelerator pedal is maintained in a constant position over a determined period of time. A rapid pedal response or a delayed pedal response can consequently be set, in particular largely freely as desired by the vehicle user.

According to at least one embodiment, the propulsion profile determines the manifestations to be used of the propulsion parameters with the aid of a plurality of propulsion curves, wherein the different propulsion curves represent different propulsion actuator presets, in particular pedal positions, and specify the propulsion parameter depending on a duration of the respective propulsion preset, in particular since a last change to the propulsion actuator preset. A propulsion profile can thus combine a speed preset for a determined pedal position with an acceleration preset for the duration of this pedal position, a pedal position preset and a development preset, so to speak.

According to at least one embodiment, the propulsion curve has a plurality of control points which each represent a combination of a propulsion actuator preset with a manifestation of a propulsion parameter and which can be modified by the vehicle user, in particular by choosing a different manifestation of the propulsion parameter. The vehicle user can, for determined propulsion actuator presets (for example, pedal position, "25% of maximum deflection", and/or maintaining the pedal in position for "4 seconds"), specify the desired manifestation of the propulsion parameter which can be set in the respective propulsion curve, i.e. in particular a speed value.

In the case of a propulsion curve which assigns different durations for which a pedal is maintained in position in each case with a speed value to be reached, an acceleration profile is indirectly specified by means of the assignment indirectly because different fixed speed differences can be assigned to different fixed durations at the same time.

According to at least one embodiment, the device has a display and input unit which has in particular a touch- and/or gesture-sensitive screen for displaying, selecting, and/or configuring, in particular modifying, one or more propulsion curves. The vehicle user can thus input their preferences.

According to at least one embodiment, the display and input unit is designed to display a propulsion profile and/or at least one propulsion curve and/or to record, as a user input to configure the propulsion curve, an in particular finger- and/or gesture-based pulling of a control point of the propulsion curve toward a different manifestation of the propulsion parameter of the propulsion curve.

According to at least one embodiment, the display and input unit is designed for real-time display of the manifestation, modified by means of the user input, of the propulsion parameter. This enables direct feedback to the vehicle user of the configuration of the propulsion curve which has been made. In addition, after the user input is complete, according to an embodiment the drive motor can, in particular with no further time delay, be controlled with the modified propulsion profile such that the vehicle user can immediately experience and/or check the effect of the modification they have made to one or more propulsion curves when the traffic situation allows it.

At least one embodiment is based on the idea of providing immediate real-time feedback at the input location via the input manifestations of the propulsion parameter. This can be achieved, for example, by a propulsion curve being displayed on a touch- and/or gesture-sensitive screen and it being possible for the propulsion curve to be manipulated by "pulling" with a finger at its display location at certain points, in certain regions, or as a whole, for example after a predetermined input function. Such "pulling" then results in a new course of the propulsion curve which then represents a modified propulsion profile.

Within the sense of the principles and embodiments described herein, different illustrations of the propulsion profile are conceivable, for example in the form of a function graph or an interpolated graph but also in the form of a point cloud or a bar chart, wherein, in order to input a modified manifestation of a propulsion parameter by means of a finger, the shape of the graph can then be changed or the individual bars can be lengthened or shortened.

According to at least one embodiment, the device has a control unit which is designed to apply an input of a modified manifestation of a propulsion parameter depending on one of the propulsion curves and/or its modification by the input function underlying the user input also to individual or a plurality of adjacent manifestations or all the manifestations of the propulsion parameter in the propulsion curve.

According to at least one embodiment, the modified propulsion profile, in particular the modified propulsion curve, is displayed essentially at the same time as the input.

According to at least one embodiment, the preset propulsion profile is loaded from a memory unit of the motor vehicle, in particular of the control device, on the display of the display unit and/or the modified propulsion profile is saved in the memory unit.

According to at least one embodiment, in each case at least one independent modifiable propulsion profile is preset for different vehicle users.

According to at least one embodiment, at least two different propulsion profiles are preset for a vehicle user, from which the vehicle user can select, and in particular also modify, a preferred propulsion profile.

According to at least one embodiment, the propulsion profile is displayed with at least one propulsion curve which can be modified by touch and/or gestures of a vehicle user to produce at least one propulsion actuator preset.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
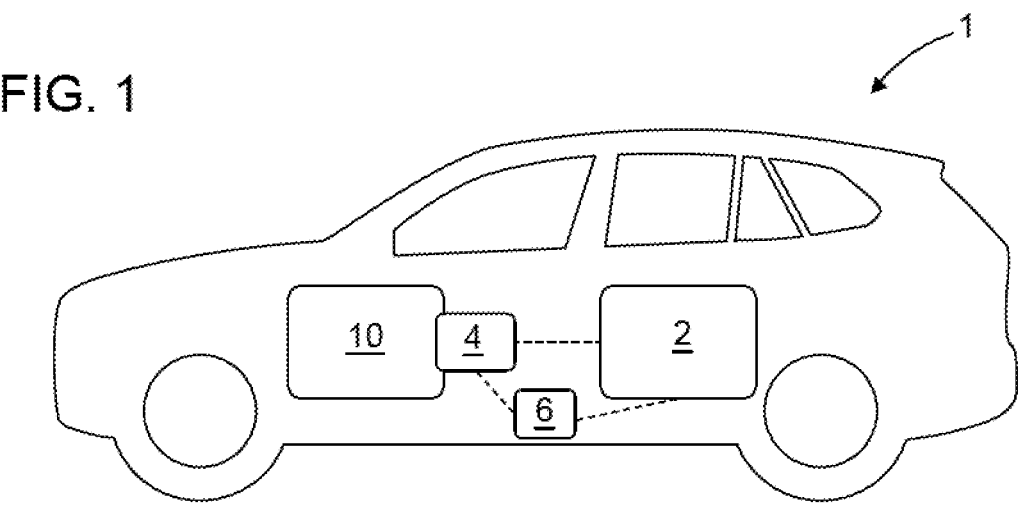
FIG. 1 schematically illustrates a motor vehicle driven by an electric motor and having a device according to at least one embodiment.

A motor vehicle 1 driven by an electric motor is illustrated in FIG. 1, having an electric drive motor 2 and a device 10 for determining a propulsion profile 12 to be applied during operation of the electric drive motor.

A control unit 4 of the motor vehicle, in this case an engine control device, is connected to the device 10 for the purpose of information exchange and is designed to modify a propulsion profile 12 to be applied depending on a user input E of a vehicle user N, in this case by means of a finger of a hand, and to control the drive motor in a correspondingly adapted fashion depending on a propulsion actuator preset, wherein the preset is here effected by means of a gas pedal 6.

Figure 2:
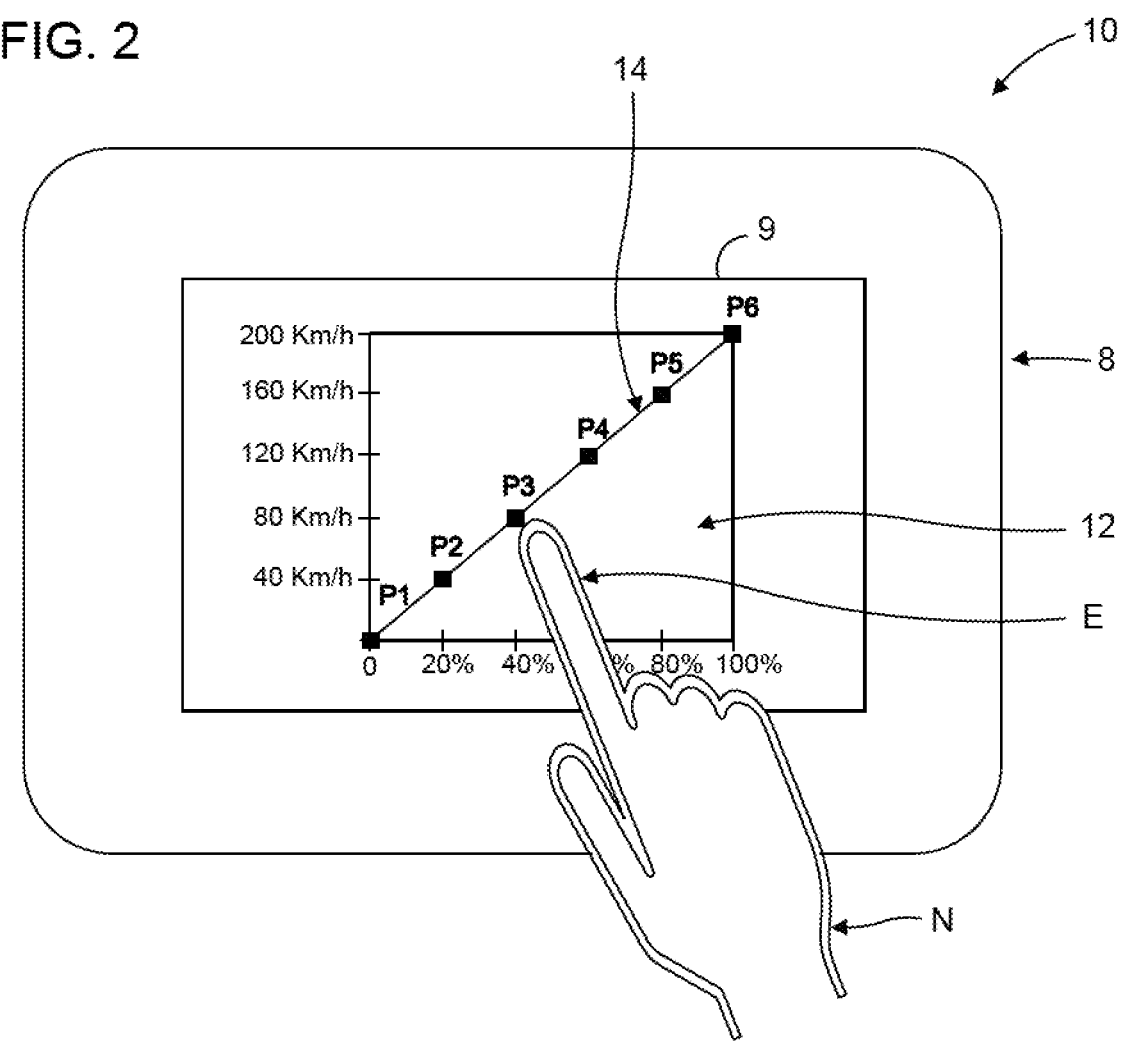
FIG. 2 schematically illustrates the device from FIG. 1.

For this purpose, the device 10 has a display and input unit 8 with a touch- and/or gesture-sensitive screen 9 (also referred to as a touchscreen) for displaying and modifying one or more propulsion profiles 12 which is illustrated schematically in FIG. 2.

In order to modify a propulsion profile 12, the display and input unit 8 is designed to display at least one propulsion curve 14 of the propulsion profile and to record, as a user input E1 to E2 (by means of a finger of the hand N1 to N2) for configuring the propulsion curve 14, a finger- and/or gesture-based pulling of a control point P of the propulsion curve 14 toward a different manifestation of the propulsion parameter K of the propulsion curve 14.

For a user input by such pulling, a finger is, for example, placed on the touchscreen 9 at a control point P3 of the propulsion curve 14 (user input E1). Then, maintaining contact, the finger is moved in a positive or negative Y direction (=ordinate) of the propulsion curve as far as the intended target point of the modification in the control point P3 (see dashed line from P3 to P'3). There, the finger is removed from the touchscreen (user input E2) and the new control point P' is thus specified. These relationships are illustrated in particular in FIG. 3.

The correspondingly modified propulsion curve 14' is displayed immediately on the touchscreen 9 when the modification is complete, i.e. in real time; according to a development of the embodiment, so is the modification itself, for example a temporary simultaneous display of the previous propulsion curve 14 compared with the modified propulsion curve 14'.

The propulsion profile 12' modified by means of the modified propulsion curve 14 can be controlled by means of the control unit 4 either automatically immediately or after confirmation/selection by the vehicle user such that the power development of the drive motor 2 takes place according to the modified preset from the modified propulsion profile 12'.

A manifestation of a propulsion parameter K to be applied, here the longitudinal speed of the vehicle v, can in each case be stored in the propulsion profile for different propulsion actuator presets A of the vehicle user, here pedal deflections x or different durations t of a determined pedal deflection x.

FIG. 4 shows three different propulsion curves 14 which specify the longitudinal speed of the vehicle v depending on a pedal deflection x (also referred to synonymously as the pedal position), i.e. take the form of speed curves.

In the speed curve, a certain speed value v therefore results which is dependent on the position of the gas pedal.

Figure 4A:
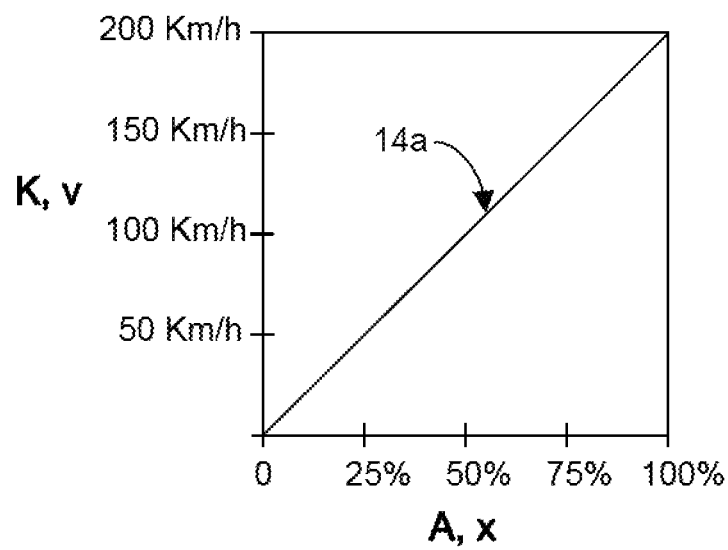
FIG. 4 illustrates exemplary propulsion curves in accordance with at least one embodiment.
Figure 4B:
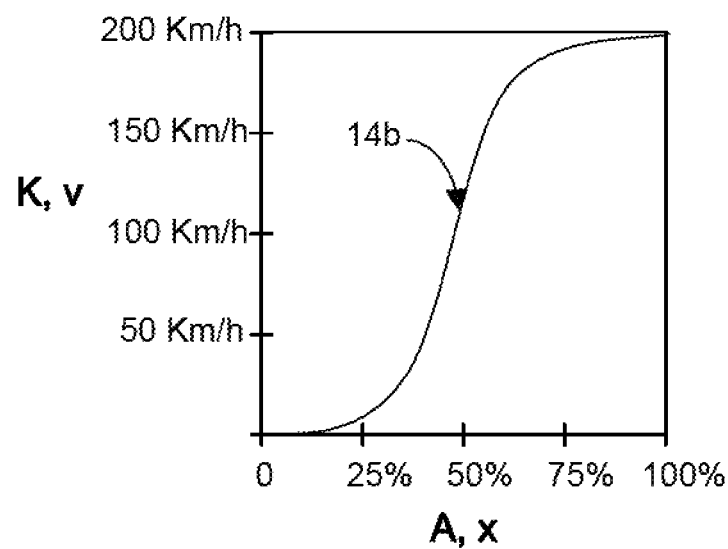
Figure 4C:
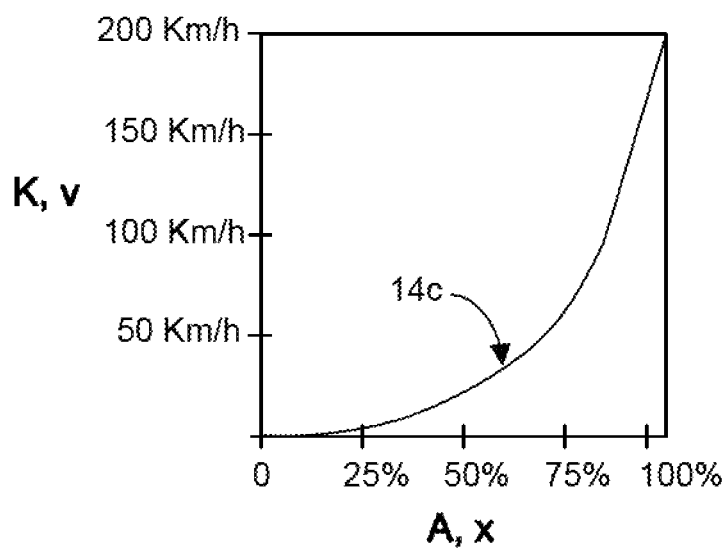

FIGS. 4a, 4b, and 4c show different examples of speed curves which could be selected by the customer as a basis for manually adapting the propulsion profile.

For example, the speed curve 14 in FIG. 4c shows an exponential course. The speed is relatively low when there is low and medium pressure on the gas pedal. Only in the case of firmer pressure on the gas pedal (in the last quarter here) does the speed increase very sharply such that high speeds are achieved only when there is firm pressure on the pedal.

The speed curve 14 in FIG. 4b, in contrast, shows a sinusoidal curve in which the greatest change in speed per change in the pedal position is provided in the middle deflection range of the pedal. Gentle moving away can thus be combined with a rapid development of speed.

The speed curve 14 in FIG. 4a shows a linear course which can correspond to the expectations of an average vehicle user.

FIG. 5 shows three different propulsion curves 114 which the longitudinal speed of the vehicle v determines depending on a duration since a previous, here the last, change in the pedal deflection. These propulsion curves describe a development of speed over time, and accordingly the propulsion parameter under consideration here is a longitudinal acceleration a of the motor vehicle, and can therefore be referred to as an acceleration curve, in particular to differentiate it from a speed curve.

The modification of the speed v depending on time (therefore, the "acceleration curve") can therefore also be specified for an unmodified position of the gas pedal (as the propulsion actuator) such that a certain speed value (for example, 50% of the target speed) is reached more or less quickly depending on the shape of the acceleration curve.

Figure 5A:
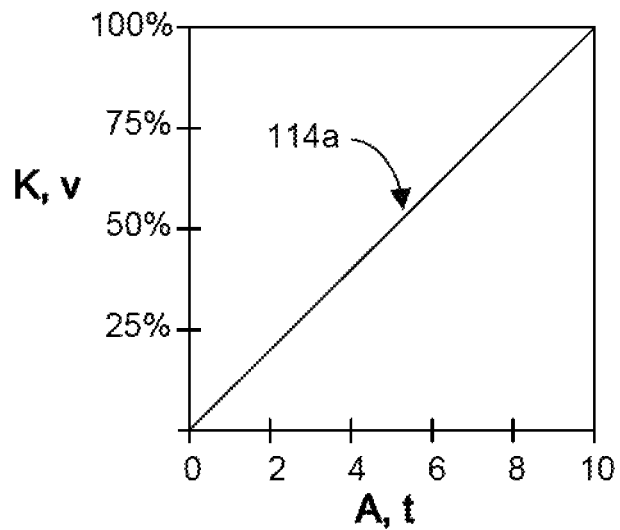
FIG. 5 illustrates further exemplary propulsion curves in accordance with at least one embodiment.
Figure 5B:
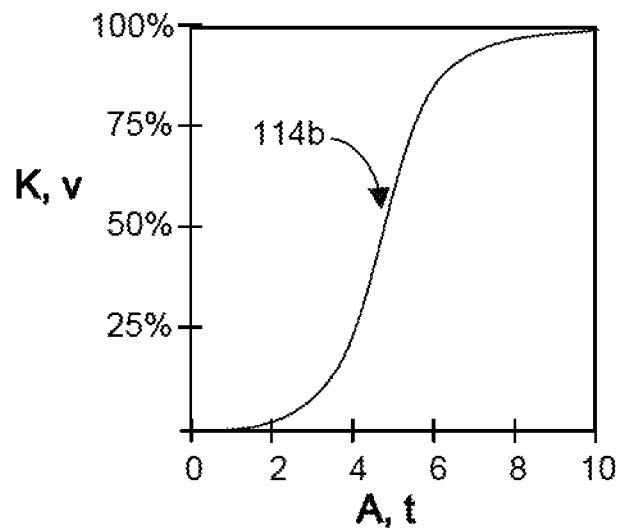
Figure 5C:
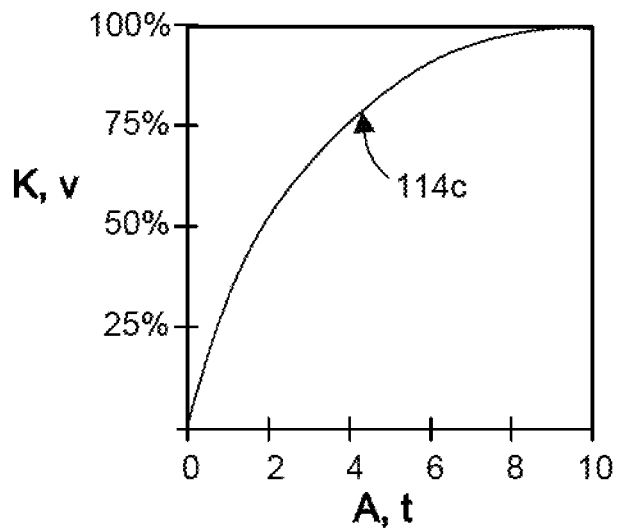

A linear development (114 in FIG. 5a), a sinusoidal development (114b in FIG. 5b), and a logarithmic development (114c in FIG. 5c) of an acceleration curve 114 are illustrated in FIG. 5, partially analogous to the speed curves 14 from FIG. 4. The logarithmic development reproduces a propulsion development which is initially very quick.

Figure 6:
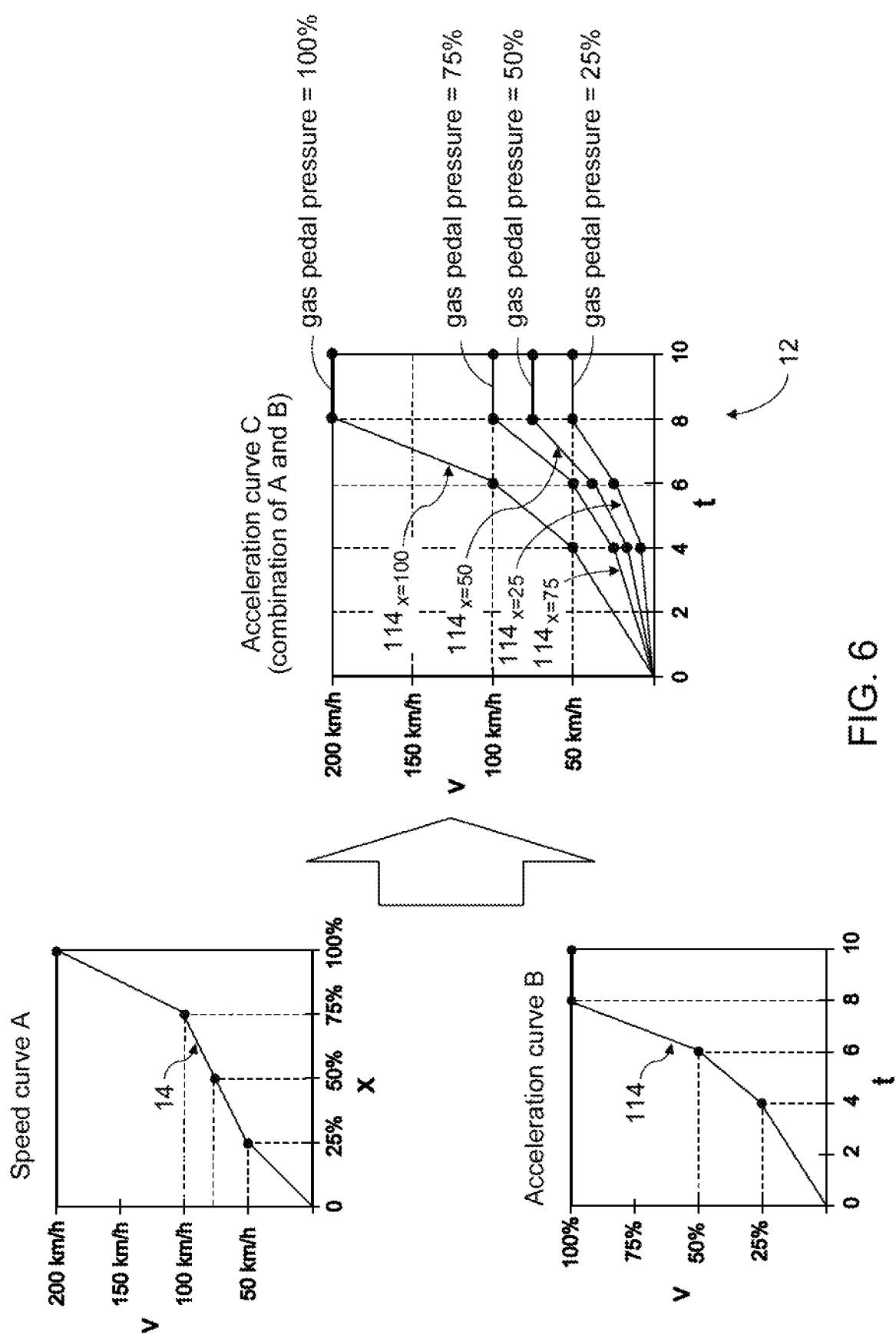
FIG. 6 schematically illustrates the generation of an exemplary propulsion profile in accordance with at least one embodiment.

As can be seen in FIG. 6, according to an exemplary embodiment, speed curves 14 according to FIG. 4 and acceleration curves 114 according to FIG. 5 can be combined in a propulsion profile 12 to form a curve combination [$114_{x=25}$, $114_{x=50}$, $114_{x=75}$, $114_{x=100}$] in order to determine a propulsion profile 12.

The propulsion profile 12 then determines the manifestations of the propulsion parameter v to be applied with the aid of a plurality of propulsion curves $114_{x=25}$, $114_{x=50}$, $114_{x=75}$, $114_{x=100}$, wherein the different propulsion curves $114_{x=25}$, $114_{x=50}$, $114_{x=75}$, $114_{x=100}$ each represent a different pedal position (25%, 50%, 75%, 100%) and the speed v in each propulsion curve $114_{x=25}$, $114_{x=50}$, $114_{x=75}$, $114_{x=100}$ is determined depending on a duration t since the last change in the pedal position.

In this case of the combined propulsion curves, on the one hand, a target speed can be specified by the vehicle user depending on the position of the gas pedal and these are combined with a selected or programmable acceleration curve in order to achieve the respective target speed (at the specified position of the gas pedal).

The following applies as a whole for this exemplary embodiment: either different speeds (cf FIGS. 2 to 4) or different acceleration curves (cf FIG. 5) or a combination thereof (cf FIG. 6—acceleration curve C) can be offered to the vehicle user for them to select and as a starting point for a personalized configuration.

The speed and/or acceleration curve selected by the vehicle user is fed into a motor control system (including PWD or decoder). When the gas pedal is pressed, the drive motor is controlled such that the selected speed and/or acceleration curve is implemented.

Different vehicle users can, depending on their preference/taste, thus own or use an e-vehicle which moves away gently or powerfully. In addition to the propulsion adaptation, the sound S of the car, i.e. of the drive corresponding to the selected propulsion characteristic, can also vary depending on the selected acceleration curve 114. This type of combination of propulsion curves to form a propulsion profile is illustrated in a simplified and schematic fashion in FIG. 6.

Figure 3:
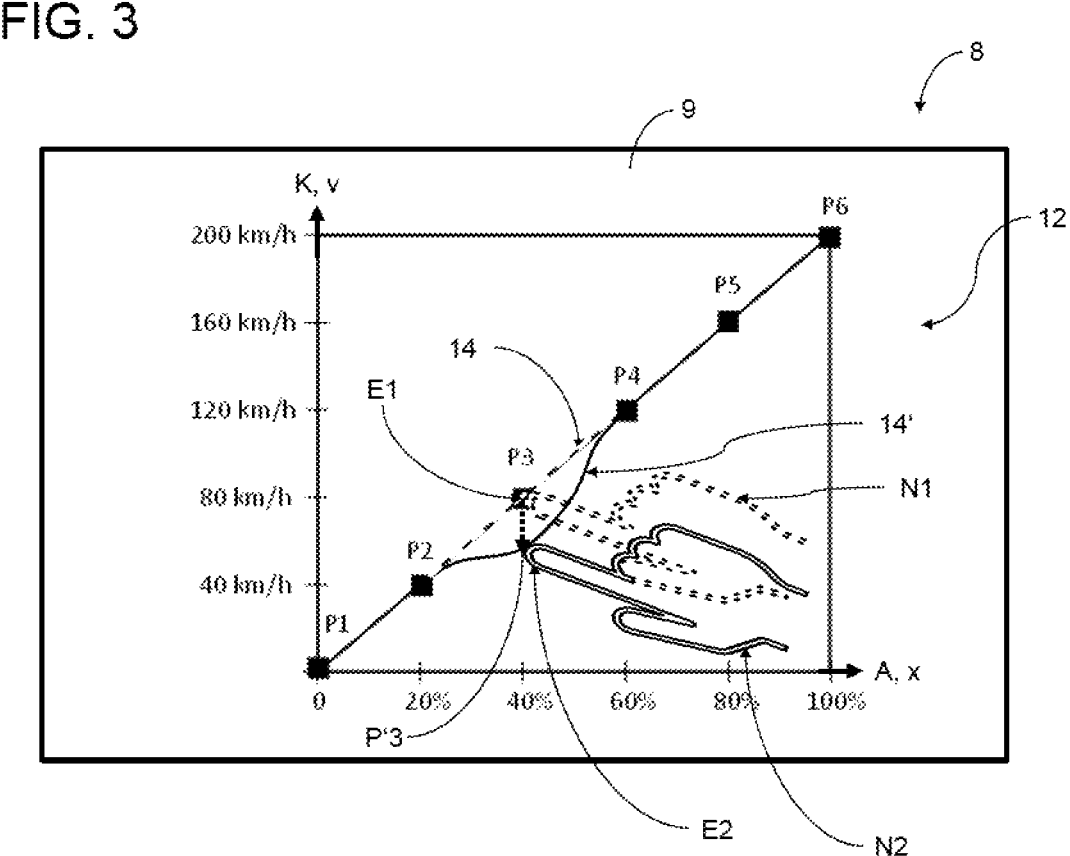
FIG. 3 schematically illustrates a user input by pulling in accordance with at least one embodiment.

As described with regard to FIGS. 2 and 3, the vehicle user is given the option of setting their own speed curve 14' and/or acceleration curve 114' themselves at a plurality of control points P.

The vehicle user here has the option of setting given values for, for example, six points P1 to P6 of the acceleration or speed curve. FIG. 3 here shows how a modification of the speed curve 14' can be made by the customer.

Figure 7:
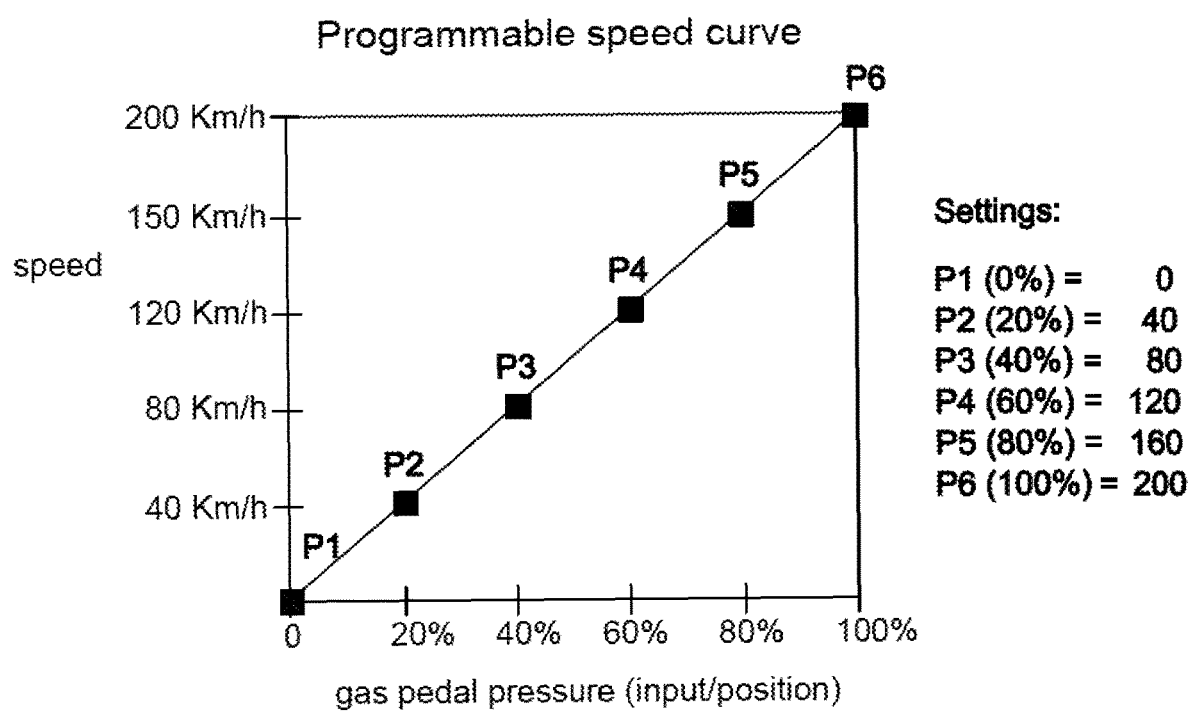
FIG. 7 schematically illustrates a further option for a user input to modify the propulsion curve in accordance with at least one embodiment.

Another option of a user input to modify the propulsion curve is illustrated in FIG. 7. The UI (user interface) here presents a 6-point curve on the left-hand side and values are input on the right-hand side.

Figure 8:
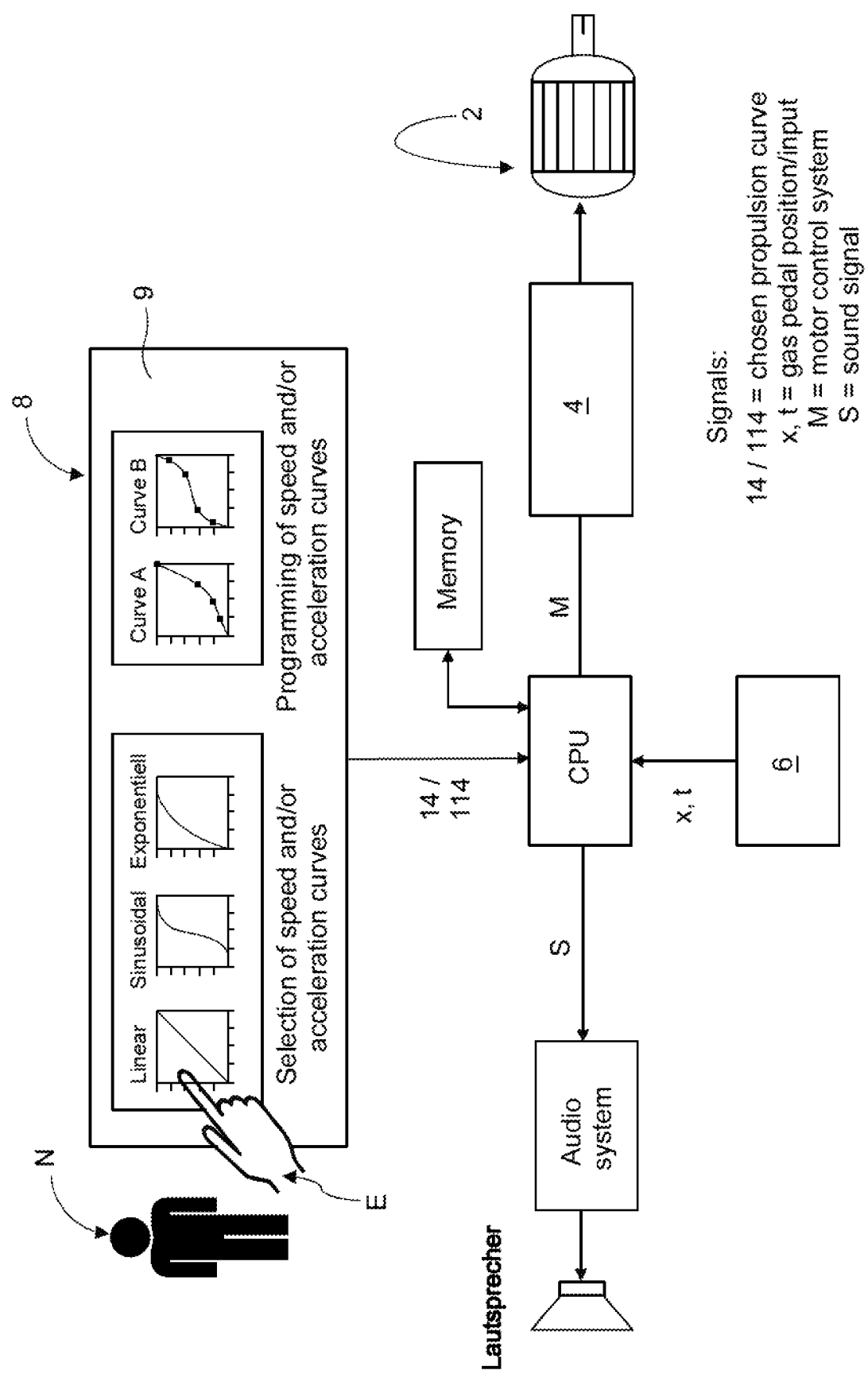
FIG. 8 schematically illustrates an exemplary connection diagram of an exemplary device according to at least one embodiment.

FIG. 8 shows a schematic connection diagram of an exemplary embodiment of a device 10.

Threshold values, i.e. defined ranges for the input of values, which can be used by the vehicle user when programming the speed and acceleration curve are saved in the CPU or the memory. The purpose of these is to prevent (portions of) propulsion curves being programmed which are too extreme/dangerous (for example, too high acceleration within a short period of time).

In the exemplary embodiment, the vehicle user is given the option of programming and successively saving a plurality of speed curves 14 and/or acceleration curves 114.

Figure 9A:
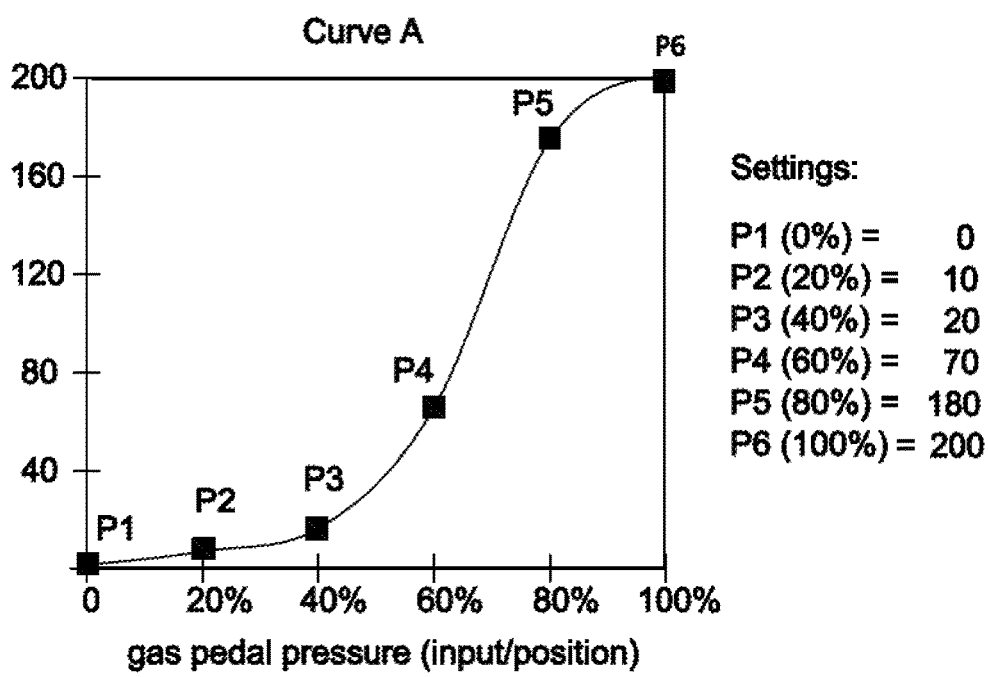
FIG. 9 schematically illustrates exemplary speed curves in accordance with at least one embodiment.
Figure 9B:
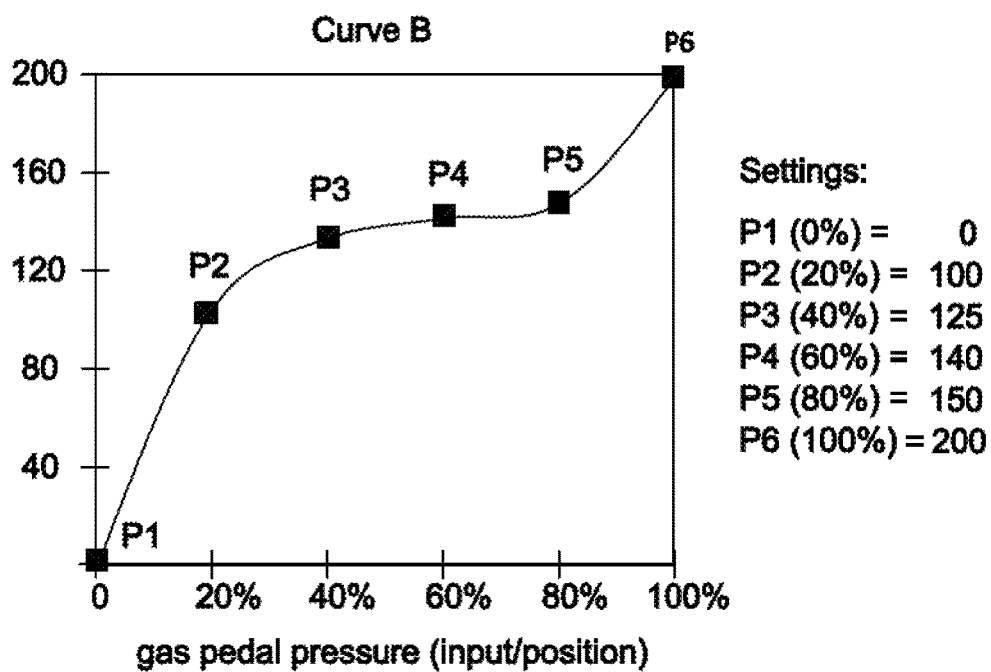

FIG. 9 shows exemplary speed curves 14 adapted in a personalized fashion, wherein curve A describes a defensive propulsion characteristic and curve B an offensive one.

Use can be made with the invention of the whole spectrum of possible acceleration curves. The curve (shapes) can have an emotional character and delight the vehicle user.

The invention offers a fun interactive option with the vehicle—the vehicle user can try out different speed and acceleration curves. Technology-minded vehicle users will especially enjoy this.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SYMBOLS 1 motor vehicle
2 drive motor
4 control unit
6 propulsion actuator, here gas pedal
8 display and input unit
9 touch- and/or gesture-sensitive screen
10 device
12 propulsion profile
14 propulsion curve (speed curve)
114 propulsion curve (acceleration curve)
A propulsion actuator preset
a longitudinal acceleration of the vehicle
E user input
K propulsion parameter
M motor control signals
N (hand of the) vehicle user
P control points of the propulsion curve
S sound signals
T duration since last change in the pedal deflection
v longitudinal speed of the vehicle
x pedal deflection (or pedal position or pedal pressure)

What is claimed is:

1. A device for determining a propulsion profile to be applied during the operation of an electric motor of a motor vehicle driven by the electric motor, wherein the device comprises:
   a memory configured to store a plurality of propulsion profiles, each propulsion profile associating manifestations of one or more propulsion parameters with propulsion actuator presets;
   a touchscreen configured to display a propulsion curve in a touch-interactive manner, wherein the propulsion curve is associated with at least one propulsion profile; and
   a controller configured to:
      determine the propulsion profile to be applied based on the propulsion curve; and
      in response to and in accordance with a touch-and-pull gesture of the user on the propulsion curve, generate a modified propulsion curve associated with at least one different propulsion profile.

2. The device of claim 1, wherein the propulsion parameter is a longitudinal speed and/or a longitudinal acceleration of the motor vehicle.

3. The device of claim 1, wherein the propulsion actuator preset is determined depending on a pedal position.

4. The device of claim 1, wherein the propulsion actuator preset is determined depending on a duration since a most recent change to the propulsion actuator preset.

5. The device of claim 1, wherein the propulsion curve reproduces a desired relationship between a pedal position and the longitudinal speed of the motor vehicle.

6. The device of claim 1, wherein the propulsion curve reproduces a desired relationship between a duration passed since a most recent change to a pedal position and the longitudinal speed of the vehicle.

7. The device of claim 1,
wherein the propulsion profile determines the manifestations to be used of the propulsion parameters with the aid of a plurality of propulsion curves,
wherein the different propulsion curves represent different propulsion actuator presets, including pedal positions, and specify the propulsion parameter depending on a duration of the respective propulsion preset since a most recent change to the propulsion actuator preset.

8. The device of claim 1, wherein the propulsion curve has a plurality of control points associating propulsion actuator presets with propulsion parameters, and wherein each control point can be modified by the vehicle user via the touch-and-pull gesture on the control point.

9. The device as claimed in claim 1, characterized in that the touchscreen is further configured to display the modified propulsion curve in real time with the touch-and-pull gesture.

10. A motor vehicle driven by an electric motor, comprising:
the device of claim 1;
an electric drive motor; and
a control unit connected to the device, wherein the control unit is configured to:
adapt and/or modify the propulsion profile to be applied for the drive motor depending on the user input of the vehicle user, and
control the drive motor accordingly.

11. A method for determining a propulsion profile for an electric motor of a motor vehicle driven by the electric motor, the method comprising:
storing a plurality of propulsion profiles in a memory, each propulsion profile associating manifestations of one or more propulsion parameters with propulsion actuator presets;
displaying a propulsion curve on a touchscreen in a touch-interactive manner, wherein the propulsion curve is associated with at least one propulsion profile;
receiving a touch-and-pull gesture of the user on the propulsion curve; and
generating a modified propulsion curve associated with at least one different propulsion profile.

12. The method as claimed in claim 11, wherein the modified propulsion curve is displayed in real time with the touch-and-pull gesture.

\* \* \* \* \*